(12) United States Patent
Cerruti et al.

(10) Patent No.: US 9,300,864 B2
(45) Date of Patent: Mar. 29, 2016

(54) SYSTEM AND RELATED METHOD FOR DETERMINING VEHICLE WHEEL ALIGNMENT

(75) Inventors: Piero Cerruti, Trana (IT); Fausto Manganelli, Trana (IT)

(73) Assignee: SPACE S.R.L. CON UNICO SOCIO (IT)

( * ) Notice: Subject to any disclaimer, the term of this patent is extended or adjusted under 35 U.S.C. 154(b) by 685 days.

(21) Appl. No.: 13/696,069

(22) PCT Filed: May 5, 2011

(86) PCT No.: PCT/IB2011/000955
§ 371 (c)(1),
(2), (4) Date: Dec. 31, 2012

(87) PCT Pub. No.: WO2011/138662
PCT Pub. Date: Nov. 10, 2011

(65) Prior Publication Data
US 2013/0194446 A1 Aug. 1, 2013

(30) Foreign Application Priority Data
May 5, 2010 (IT) .............................. TO2010A0377

(51) Int. Cl.
*G01B 11/26* (2006.01)
*H04N 5/232* (2006.01)
*G01B 11/275* (2006.01)

(52) U.S. Cl.
CPC ........ *H04N 5/23229* (2013.01); *G01B 11/2755* (2013.01); *G01B 2210/143* (2013.01); *G01B 2210/30* (2013.01)

(58) Field of Classification Search
CPC .... G01B 11/2755; G01B 11/275; G01B 5/25; G01B 5/255; G01B 2210/283; G01B 2210/286; G01C 15/004; G01C 15/002; G01C 15/02; H04N 5/23229
USPC ................. 356/155, 139.9; 33/288, 286, 281, 33/203.18
See application file for complete search history.

(56) References Cited

U.S. PATENT DOCUMENTS 4,319,838 A * 3/1982 Grossman et al. ....... 356/139.09
4,455,759 A * 6/1984 Coetsier ......................... 33/288

(Continued)

FOREIGN PATENT DOCUMENTS

EP   1434169   6/2004
JP   4370706   12/1992

(Continued)

*Primary Examiner* — Luke Ratcliffe
*Assistant Examiner* — Assres H Woldemaryam
(74) *Attorney, Agent, or Firm* — The Belles Group, P.C.

(57) ABSTRACT

A system for determining the orientation of at least one first wheel of a vehicle and provided with: at least one first target integrally coupled to the first wheel, an image-capturing device that acquires a first two-dimensional image of the first target and a processing device, operatively connected to the image-capturing device and processing the first two-dimensional image. The first target has a three-dimensional shape suitable for defining geometric quantities arranged according to a known three-dimensional arrangement; the processing device processes the first two-dimensional image to identify the projections of the geometric quantities and determine a spatial arrangement of the first target with respect to a reference system based on the geometrical characteristics of the projections, to determine the orientation characteristics of the first wheel.

16 Claims, 9 Drawing Sheets

(56) References Cited

U.S. PATENT DOCUMENTS

| | | | |
|---|---|---|---|
| 4,854,702 A * | 8/1989 | Stieff | 356/155 |
| 5,048,954 A * | 9/1991 | Madey et al. | 356/155 |
| 5,313,711 A * | 5/1994 | Kling et al. | 33/288 |
| 5,724,743 A * | 3/1998 | Jackson | 33/288 |
| 5,748,301 A * | 5/1998 | Muller et al. | 356/155 |
| 5,809,658 A * | 9/1998 | Jackson et al. | 33/288 |
| 5,842,281 A * | 12/1998 | Mieling | 33/203.18 |
| 6,313,911 B1 * | 11/2001 | Stieff | 356/139.09 |
| 6,532,673 B2 * | 3/2003 | Jahn et al. | 33/193 |
| 6,634,109 B1 * | 10/2003 | Dale et al. | 33/203 |
| 6,658,749 B2 * | 12/2003 | Jackson et al. | 33/203.12 |
| 6,748,796 B1 | 6/2004 | Van Den Bossche | 73/116.01 |
| 7,164,472 B2 * | 1/2007 | Dorrance et al. | 356/139.03 |
| 7,313,869 B1 * | 1/2008 | Rogers et al. | 33/203.18 |
| 7,444,752 B2 * | 11/2008 | Stieff et al. | 33/203.18 |
| 7,710,555 B2 * | 5/2010 | Hoenke et al. | 356/155 |
| 7,864,309 B2 * | 1/2011 | De Sloovere et al. | 356/139.09 |
| 7,877,883 B2 * | 2/2011 | Schommer et al. | 33/203 |
| 7,908,751 B2 * | 3/2011 | Nobis et al. | 33/288 |
| 8,059,955 B2 * | 11/2011 | Ohara et al. | 396/125 |
| 8,104,185 B2 * | 1/2012 | Gray et al. | 33/203.18 |
| 8,125,537 B2 * | 2/2012 | Maekawa | 348/231.2 |
| 8,149,298 B2 * | 4/2012 | Ohara et al. | 348/240.99 |
| 8,196,461 B2 * | 6/2012 | Abraham et al. | 73/117.01 |
| 8,334,500 B2 * | 12/2012 | Ohara et al. | 250/216 |
| 8,363,129 B2 * | 1/2013 | Ohara et al. | 348/240.99 |
| 8,448,342 B2 * | 5/2013 | Nobis et al. | 33/288 |
| 8,522,609 B2 * | 9/2013 | Nobis et al. | 73/117.03 |
| 8,567,678 B2 * | 10/2013 | Ohara et al. | 235/454 |
| 8,573,363 B2 * | 11/2013 | Healy et al. | 187/216 |
| 8,638,452 B2 * | 1/2014 | Muhle et al. | 356/615 |
| 2004/0128844 A1 * | 7/2004 | Robb et al. | 33/203.18 |
| 2005/0096807 A1 * | 5/2005 | Murray et al. | 701/29 |
| 2006/0152711 A1 * | 7/2006 | Dale et al. | 356/139.09 |
| 2007/0283582 A1 * | 12/2007 | Donner et al. | 33/228 |
| 2008/0289202 A1 * | 11/2008 | Kassouf et al. | 33/288 |
| 2009/0216484 A1 * | 8/2009 | Schommer et al. | 702/150 |

FOREIGN PATENT DOCUMENTS

| | | | |
|---|---|---|---|
| WO | 2004/023783 | | 3/2004 |
| WO | WO2004023783 | * | 3/2004 |
| WO | 2008/143614 | | 11/2008 |
| WO | WO2008143614 | * | 11/2008 | G01B 11/275 |

* cited by examiner

SYSTEM AND RELATED METHOD FOR DETERMINING VEHICLE WHEEL ALIGNMENT

CROSS-REFERENCE TO RELATED PATENT APPLICATIONS

The present application is a U.S. national stage application under 35 U.S.C. §371 of PCT Application No. PCT/IB2011/000955, filed May 5, 2011, which claims priority to Italian Application No TO2010A000377, filed May 5, 2010, the entireties of which are incorporated herein by reference.

TECHNICAL FIELD

The present invention, relates to a system and related method for determining vehicle wheel alignment.

BACKGROUND ART

Systems are known for determining vehicle wheel alignment, in particular for a motor vehicle, which enable the automatic measuring of one or more characteristic angles of the wheels, for example, the convergence and camber angles, in order to check the correct reciprocal alignment of the wheels. In fact, as is known, incorrect alignment can cause excessive or uneven tyre wear and also cause driving and vehicle stability problems.

In general, systems for determining vehicle wheel alignment are configured to detect the orientation of the plane of each wheel with respect to a single set of three orthonormal axes taken as reference (it should be noted that the "plane of the wheel" is intended as the plane on which the outer side surface of the wheel lies), so as to enable suitable corrective actions to be taken to restore the reciprocal alignment of the wheels.

In particular, some systems envisage the use of detection elements for the characteristic angles, or in any case suitable sensitive elements, directly connected to the wheels of the vehicle via special mounting devices (so-called "clamps"), in order to identify the set-up geometry; in this case, great care is needed in mounting them on the wheels in order to avoid damaging delicate parts.

Other systems move the observation point outside of the vehicle, so as to define a fixed reference system with respect to that of the set-up, by means of observing angular variations of the wheels through one or more image acquisition devices unconstrained by the orientation of the vehicle. In particular, some systems contemplate positioning the image acquisition devices directly on the car lift (able to raise the vehicle under observation in a known manner); other systems contemplate positioning the same image acquisition devices on structures that are fixed or independently movable, located at a distance from and free with respect to both the vehicle and the car lift. In the first case, the image acquisition devices follow the movements of the car lift, but, because of this, they must dynamically compensate distortion; in the second case, the image acquisition devices must lock onto the car lift via controlled movements so as to remain aimed on the wheels, but do not need to compensate distortion.

Usually, such systems use suitable targets mounted on the wheels of the vehicle so as to highlight their rotation and position in space.

In particular, the targets have a flat surface depicting two-dimensional images of various shapes that can be recognised by the image acquisition devices. A processing device coupled to the image acquisition devices generally performs a so-called "best fit" operation on the geometries of the two-dimensional images identified on a generally flat surface forming part of the real target and the two-dimensional images that the image acquisition devices provide in their reference system. This operation enables the spatial orientation of the target to be determined dynamically and therefore to define elementary rotations and translations regarding the linear and angular movement of each wheel within a single reference system (for example, the vehicle's reference system). Afterwards, these elementary rotations and translations, opportunely linked together, are used for the definition of further, more complex rotations and translations that more specifically concern the vehicle's set-up and alignment characteristics.

For example, WO 2008/143614 A1 discloses an alignment determining system that contemplates the use of targets connected to the wheels of a vehicle. Each target is formed by a set of two-dimensional target elements (in particular, having the form of circles), arranged on multiple planes, mutually parallel to each other or forming a preset angle. The system provides for the identification of the target elements on their associated planes from the acquired images and the implementation of "best fit" algorithms, for example, the mean square mathematical algorithm, to determine the orientation of the targets with respect to a reference system.

However, neither does this solution depart from the traditional ones, as it maintains a typically two-dimensional analytical approach (by means of the best fit operation, i.e. a mathematical and not a geometrical solution), considering the displacement of each individual point identified in the acquired images on the associated plane with respect to the configuration of the real target. Accordingly, even this solution does not allow an increase in measurement resolution to be achieved for a given size of the targets.

Although advantageous in certain aspects, known systems have the drawback of requiring a stereo system for image acquisition, which entails the presence of a plurality of image acquisition devices and acquired images for each target observed. Alternatively, in the case of using a sole image acquisition device, it becomes necessary to perform a suitable recognition procedure for the orientation of the target with respect to the sole image acquisition device, by means of observing the target during suitable movements of the vehicle (for example, forwards and backwards, the so-called "run-out" operation), or during suitable movements of the target itself.

In addition, acquisition of the geometrical characteristics of the two-dimensional target becomes difficult as the inclination of the target changes, resulting in inconsistency in the accuracy of the measurements taken.

Furthermore, in known systems that contemplate the identification of target elements as geometric points on a surface, measurement precision can be compromised in the case where one or more of these target elements are hidden or, in any case, cannot be seen by the image acquisition devices.

The need is therefore felt in this field for developing a system for determining the orientation of vehicle wheels that provides greater resolution and precision in angle measurements, does not contemplate the need to perform specific vehicle displacement manoeuvres in order to identify the orientation of the targets and that is also of simple and economic implementation.

DISCLOSURE OF INVENTION

The object of the present invention is to provide a system for determining the orientation of vehicle wheels that totally or partially solves the above-indicated drawbacks and satisfies the above-mentioned need.

According to the present invention, a system and a method for determining the orientation of vehicle wheels is thus provided, substantially as respectively described in claims 1 and 17.

BRIEF DESCRIPTION OF THE DRAWINGS

For a better understanding of the present invention, some preferred embodiments shall now be described, purely by way of non-limitative example and with reference to the attached drawings, where.

BEST MODE FOR CARRYING OUT THE INVENTION

Figure 1:
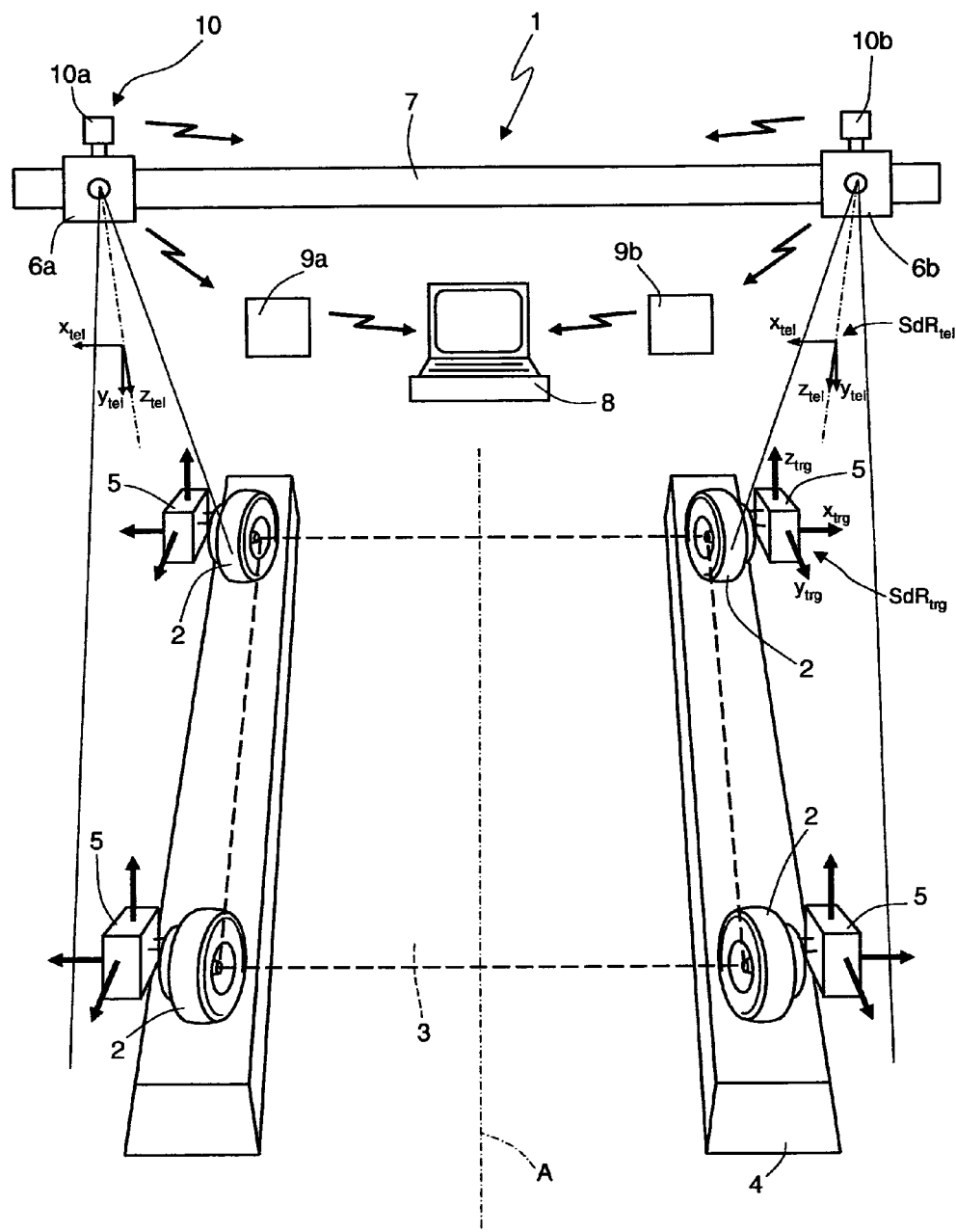
FIG. 1 is a schematic representation of a vehicle wheel alignment system, according to one aspect of the present invention.

FIG. 1 shows a system, indicated as a whole by reference 1, for determining the orientation of the wheels 2 of a vehicle 3 (shown schematically). In the example shown, the vehicle 3 is a motor vehicle equipped with four wheels 2, arranged in pairs respectively on the left-hand and right-hand side with respect to a longitudinal axis A of the vehicle; the vehicle 3 is shown positioned on a car lift 4, of a known type and shown schematically.

The system 1 comprises a plurality of targets 5, shown schematically, equal in number to the number of wheels 2, each target 5, the structure and function of which shall be described in detail further on, being mechanically coupled to a respective wheel 2 by a mounting element, or "clamp" (here not shown); this mounting element can be made, for example, as described in the Italian utility models IT-0000254272 and IT-0000254273, filed by the same Applicant.

The system 1 also comprises a first and a second image-capturing device 6a and 6b, for example, consisting of cameras arranged respectively on the right-hand and left-hand sides of the vehicle 3 with respect to the longitudinal axis A. In particular, the first image-capturing device 6a is placed so that a respective viewing area includes the wheels 2 on the left-hand side of the vehicle 3; similarly, the second image-capturing device 6b is placed so that a respective viewing area includes the wheels 2 on the right-hand side of the same vehicle 3. In particular, the image-capturing devices 6a and 6b are arranged with respect to the vehicle 3 and the associated wheels 2 such that each target 5 is only viewed by one of these image-capturing devices 6a and 6b.

Each image-capturing device 6a and 6b has a respective image reference system $SdR_{tel}$, defined by a set of three orthogonal axes $x_{tel}$, $y_{tel}$ and $z_{tel}$, where the transverse axes $x_{tel}$ and $y_{tel}$ define the image plane associated with the two-dimensional images captured by the respective image-capturing device 6a and 6b (i.e. the plane on which the dimensions of the objects are evaluated by the number of pixels), and the orthogonal axis $z_{tel}$ coincides with the optical axis of the same image-capturing device 6a and 6b.

In the embodiment shown, the first and the second image-capturing devices 6a and 6b are carried on the same support structure 7, including a horizontal cross-beam that carries the same image-capturing devices 6a and 6b at its end portions; the support structure 7 is configured to enable automatic or manual positioning of the image-capturing devices 6a and 6b with respect to the vehicle 3 (or, in a similar manner, with respect to the car lift 4). Alternatively, in a manner not shown herein, the image-capturing devices 6a and 6b can be constrained to respective mutually independent vertical structures, with the possibility, for example, of sliding vertically to be able to lock onto the adjustment position of the car lift 4, or being constrained to the same car lift 4 so as to follow its movements.

The system 1 also comprises a processing device 8, for example, in the form of a personal computer or any other computer device equipped with a processor or similar calculation means, operatively connected to the first and second image-capturing devices 6a and 6b; in particular, the processing device 8 is connected to the first image-capturing device 6a by means of a first communications interface 9a, configured to implement wireless or wired data transfer (using any known technique), and is connected to the second image-capturing device 6b by means of a second communications interface 9b, this also configured to implement wireless or wired data transfer (again, using any known technique). As shall be described in detail further on, the processing device 8 is configured to process the two-dimensional images provided by the image-capturing devices 6a and 6b with reference to the respective image reference systems, in order to determine the spatial orientation characteristics of the wheels 2 of the vehicle 3.

In the embodiment shown, the system 1 further comprises a coupling structure 10, which shall also be described in detail in the following, configured to ensure that a desired reciprocal positioning and orientation relationship between the image reference systems $SdR_{tel}$ associated with the image-capturing devices 6a and 6b is maintained, so that it is possible to establish a relation between the associated angle measurements and so determine the alignment characteristics of the wheels 2 in a single common reference system (for example, the reference system of the vehicle 3).

Figure 2A:
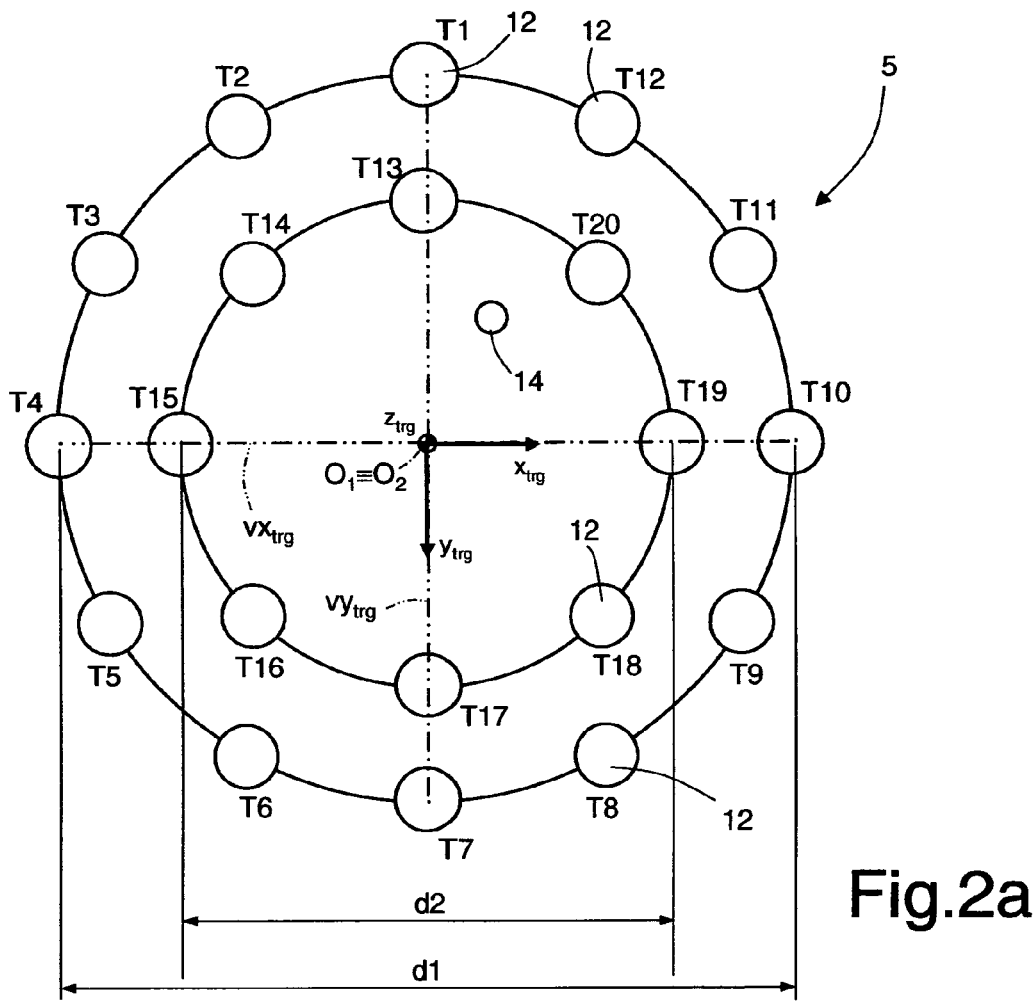
FIGS. 2a and 2b respectively show a plan view and a front view of portions of a three-dimensional target used in the system in FIG. 1.
Figure 2B:
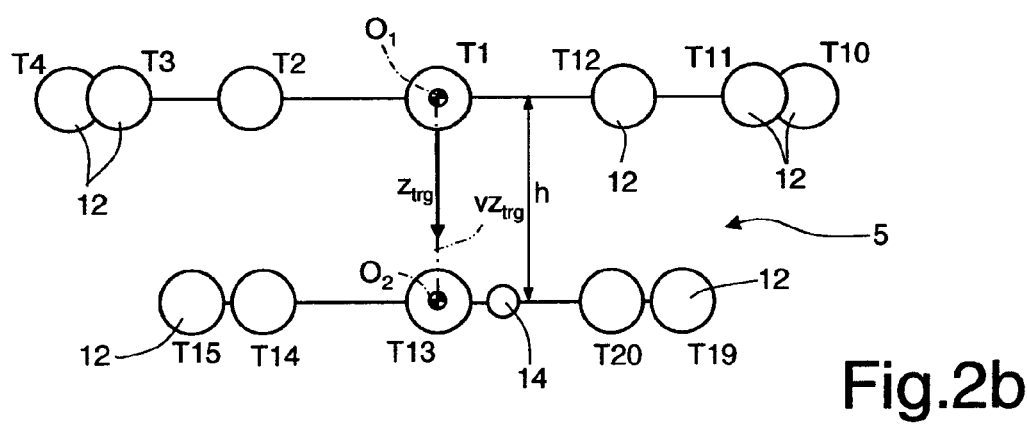
Figure 3A:
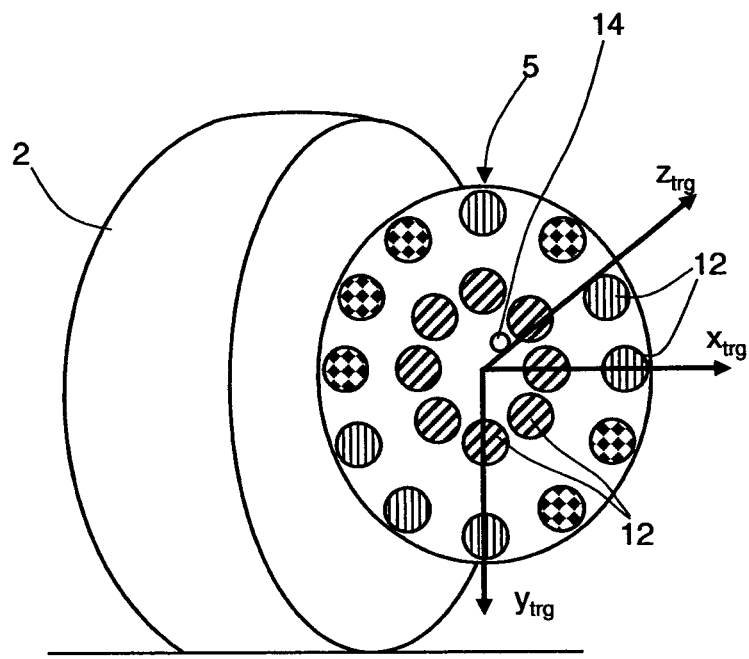
FIGS. 3a and 3b show schematic perspective views of the target coupled to the wheel of a vehicle, in the presence of different orientation angles of the same wheel.
Figure 3B:
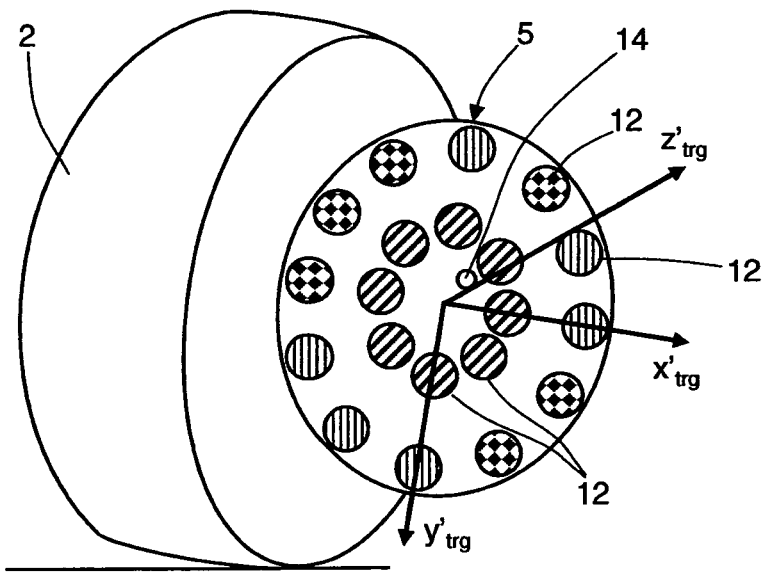

According to one aspect of the present invention, also with reference to FIGS. 2a and 2b and to the following FIGS. 3a and 3b, each target 5 has a particular "real" three-dimensional geometry, such as to enable the identification of vector quantities arranged according to a known three-dimensional arrangement and, in particular, the identification of a set of three orthogonal axes associated with the orientation of the same target 5, also identifiable by processing a single two-dimensional image originating from a sole image-capturing device (and without carrying out any "run-out" manoeuvre).

In particular, each target 5 is composed of a plurality of target elements 12, these also having a three-dimensional shape, arranged as a whole to form the three-dimensional structure of the same target 5 and having a geometric shape such as to enable easy identification in the two-dimensional images taken by the image-capturing devices 6a and 6b. The target elements 12 are reciprocally arranged according to a three-dimensional geometric configuration definable by means of a given analytical expression (and associated with a "canonical" three-dimensional geometric shape), this analytical expression describing the reciprocal arrangement of these same target elements.

A (non-limitative) example of a target 5 is schematically shown in the above-mentioned FIGS. 2a, 2b and 3a, 3b; in the embodiment shown, the target 5 is composed of two concentric circular rings of target elements 12, arranged one inside the other (an outer, first ring of diameter $d_1$, greater than an inner, second ring of diameter $d_2$). The two circular rings are arranged on two distinct planes, mutually parallel and superimposed, with the respective centres $O_1$ and $O_2$ separated by a distance h.

In particular, the target elements 12 are angularly equispaced from one another along the circumference of the respective outer or inner circular ring. In the embodiment shown, the outer ring is composed, for example, of twelve target elements (which in the above-mentioned FIGS. 2a and 2b are identified by references numbered in the anticlockwise direction and indicated as $T_i$, $1<i<12$), while the inner ring is composed of eight target elements 12 (these also numbered in the anticlockwise direction in the above-mentioned FIGS. 2a and 2b and indicated as $T_{i'}$, $13<i'<20$); accordingly, the target elements 12 of the outer ring are mutually arranged at a first angular distance, equal to 30° in the example, while the target elements 12 of the inner ring are mutually arranged at a second angular distance, greater than the first and equal to 45° in the example.

Each target element 12 has, as previously pointed out, a three-dimensional geometric shape and, in particular, a spherical shape. Advantageously, this spherical shape ensures that the same target elements 12 maintain an unaltered shape in two-dimensional images from whatever angle they are taken (within a given angular range), in this way being easily identifiable; in particular, the associated geometric centre, henceforth defined as the "sphere centre", is easily identifiable in these two-dimensional images. In fact, the spheres exhibit isotropic characteristics both with respect to shape and with respect to reflection. Given that their shape remains circular, it is therefore possible to find the position of the individual target element 12 even in the case where it remains partially covered by other target elements due to the viewing angle. Furthermore, given their spherical shape, any reflections on the surface caused by light sources in the measurement environment are present on all the target elements 12 in the same position (typically central, if the main lighting is coaxial to the optical axis of the image-capturing devices 6a and 6b); the effects due to these reflections are therefore easily eliminated through post-processing.

In particular, it is possible to associate a set of three orthogonal axes $X_{trg}$, $Y_{trg}$ and $Z_{trg}$ with the target 5 defining a target reference system $SdR_{trg}$, the spatial orientation of which corresponds to the orientation of the wheel 2 to which the same target 5 is integrally coupled.

In detail, a set of three mutually orthogonal vectors are identified inside the target 5, each one aligned along a respective orthogonal axis $X_{trg}$, $Y_{trg}$ and $Z_{trg}$. In particular, an orthogonal vector $vz_{trg}$ is identified, corresponding to the vector joining the two centres $O_1$ and $O_2$ of the outer and inner circular rings formed by the target elements 12. In this regard, it should be noted that in the described embodiment, the arrangement of the target elements 12 on two concentric rings positioned on two parallel planes is advantageous; in fact, even though the two rings may appear as two ellipses on the image plane, due to the inclination of the target 5, the related centres $O_1$ and $O_2$ are always identifiable and the vector joining these centres $O_1$ and $O_2$ always appears as the orthogonal vector $vz_{trg}$ associated with axis $Z_{trg}$ of the real target 5. It follows that determining the displacement of the centres $O_1$ and $O_2$ allows the inclination of this axis $Z_{trg}$ to be determined.

In addition, the fact that the images of the spheres must always be superimposable on the two ellipses enables possible errors committed during image processing to be detected and corrected, for example, those due to noise that may be inevitably added to the scene. In this regard, the positions returned by the image-processing algorithm are corrected so that they are brought as close as possible to the ellipse that interpolates the position of the spheres for which the image processing process has returned a shape error below a preset threshold. This correction operation provides more stability to the position of the spheres in the image plane and therefore to the measurement. In particular, the spherical shape of the target elements 12 is found to be advantageous in this respect, permitting the application of shape-factor evaluation algorithms (the shape of the target elements 12 must in fact be circular in the two-dimensional image).

A first and a second transverse vector $vx_{trg}$ and $vy_{trg}$ based on the position of specific target elements 12 are also identified within the same target 5. For example, the first transverse vector $vx_{trg}$ corresponds to the vector joining the sphere centres of the target elements 12 of the outer circular ring, indicated be references T4 and T10 in the above-mentioned FIGS. 2a, 2b and 3a, 3b (aligned along axis $X_{trg}$), while the second transverse vector $vy_{trg}$ corresponds to the vector joining the sphere centres of the target elements 12, again belonging to the outer circular ring and indicated by references T1 and T7 (aligned along axis $Y_{trg}$); the transverse vectors $vx_{trg}$ and $vy_{trg}$ are thus vectors that are orthogonal to each other and lying on the plane of the target elements 12 of the outer circular ring. Henceforth, the above-mentioned vectors $vx_{trg}$, $vy_{trg}$ and $vx_{trg}$ shall be referred to as "target vectors" (as they are associated with the real structure of the target 5).

In order to facilitate identifying the target elements 12 defining the transverse vectors $vx_{trg}$ and $vy_{trg}$ in the two-dimensional images that are acquired from the image-capturing devices 6a and 6b, the target 5 can advantageously comprise one or more reference elements 14 that indicate the orientation, these also having a three-dimensional geometry and in particular a spherical shape, for example, with a smaller diameter than the target elements 12 (so as to be easily identifiable). In the example shown in above-mentioned FIGS. 2a, 2b and 3a, 3b, there is only a single reference element 14, arranged near to the target element 12 indicated by reference T13, on the plane of the inner circular ring. However, it is evident that the number of reference elements 14 can vary (and in particular be more than one), as may their spatial arrangement also vary. Suitable reference elements 14, arranged in predetermined positions with respect to the target elements 12, may also be used to distinguish between the targets 5 associated with the right-hand side and those associated with the left-hand side of the vehicle 3, with respect to the longitudinal axis A.

In alternative, or even in addition, to using reference elements 14, and again for the purpose of facilitating identification of the set of three orthogonal axes $X_{trg}$, $Y_{trg}$ and $Z_{trg}$ associated with the target 5, a specially provided colour code associated with the target elements 12 (or other means of unambiguous identification of each of the target elements 12)

could be used in the system 1. For example, the target elements 12 belonging to the outer circular ring could have mutually different colours (or different shades, tones or contrasts of colour) according to a predetermined code that enables identification of reciprocal positioning. By using the colour code shown by way of example in FIGS. 3a and 3b, it is possible to identify each of the target elements 12 by observing a sequence of three, or at most four in ambiguous cases, mutually consecutive target elements 12 along the respective circular ring. In a substantially similar manner, provision could also be made for using different geometrical characteristics for the target elements 12 (for example, the various target elements 12 could be formed by spheres of different diameter). In any case, it is possible for the image-capturing devices 6a and 6b to identify the absolute orientation of the target 5 in the associated reference system.

In use, with particular reference to FIGS. 3a and 3b, the target 5 is coupled to a respective wheel 2 of the vehicle 3 by using a special mounting element (clamp), such that it can assume the desired orientation (for example, such that the plane defined by axes $Y_{trg}$ and $Z_{trg}$ approximates the one parallel to the plane of the wheel itself and axis $X_{trg}$ approximates the normal thereof). The relation between the reference system of the target and that of the wheel is guaranteed by construction or through carrying out a suitable calibration and adjustment procedure.

In particular, FIG. 3b shows the effect of a different angle of the wheel 2 of the vehicle 3, which is turned by a given angle with respect to the arrangement shown in FIG. 3a; it may be noted how the orientation of the target 5 associated with the same wheel 2 and that of the set of three orthogonal axes, indicated here as $X'_{trg}$, $Y'_{trg}$ and $Z'_{trg}$, of the associated target reference system $SdR_{trg}'$ have changed in consequence.

Figure 4:
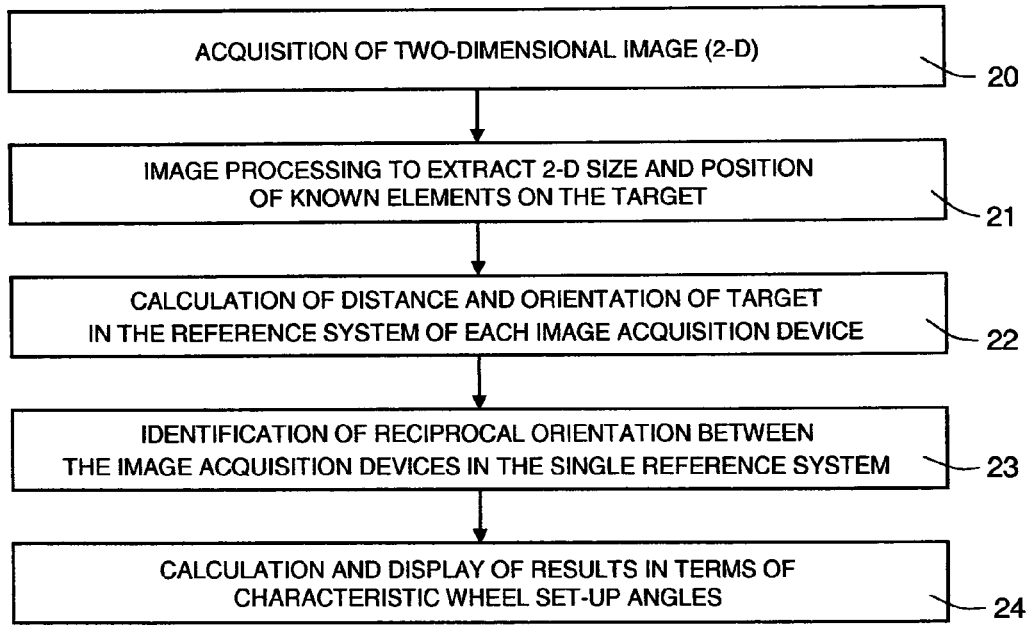
FIG. 4 shows a flowchart of the operations for determining orientation executed by a processing unit of the system in FIG. 1 and used for determining the set-up of a vehicle.

The operations carried out by the processing unit 8 of system to determine the alignment of the wheels 2 of vehicle 3 shall now be described, with reference to the flowchart in FIG. 4.

In a first step, indicated by reference 20, the first and second image-capturing devices 6a and 6b take shots of their respective targets 5 and send the two-dimensional images acquired in the respective image reference systems $SdR_{tel}$ (containing in a known manner a set of pixels representing the captured images), to the processing unit 8 via the respective interfaces 9a and 9b.

Then, in a successive step 21, the processing device 8 digitally processes the two-dimensional images of each target to identify the position of the target elements 12 considered significant, i.e. that identify in a predetermined manner the set of three orthonormal axes associated with the target 5; in particular, the processing device 8 identifies the projections of the target vectors $vx_{trg}$, $vy_{trg}$ and $vz_{trg}$, on the image plane, henceforth respectively indicated as $vx_{trg\_prj}$, $vy_{trg\_prj}$ and $vz_{trg\_prj}$ (and referred to as "projection vectors").

In greater detail, after identifying the positions of the sphere centres of the target elements 12, the processing device 8 determines the position of the projection vectors $vx_{trg\_prj}$, $vy_{trg\_prj}$ and $vz_{trg\_prj}$ in the acquired two-dimensional image (using the previously described criteria) and then determines the dimensions thereof (in terms of the number of pixels). In particular, for each of the above-mentioned projection vectors, the processing device 8 calculates the dimensions ($\Delta$xpix, $\Delta$ypix)i in the image plane, expressed as the number of pixels along the transverse axes $X_{tel}$ and $Y_{tel}$ of the same image plane (here, the i index indicates the relative projection vector chosen from $vx_{trg\_prj}$, $vy_{trg\_prj}$ or $vz_{trg\_prj}$). The dimensions of these projection vectors expressed in the chosen length measurement unit, in mm for example, will be subsequently indicated as ($\Delta$xmm, $\Delta$ymm)i.

In particular, the real dimensions of the target vectors $vx_{trg}$, $vy_{trg}$ and $vz_{trg}$ are known in the same length measurement unit (as the geometrical dimensions of the target 5 are known by design); these real dimensions, expressed in mm for example, are henceforth indicated as $\Delta x_{trg}$, $\Delta y_{trg}$ and $\Delta z_{trg}$.

In a successive step 22, the processing device 8 then determines the orientation of the targets 5 in the respective image reference system $SdR_{tel}$, using the previously acquired information, and also determines the distance D between the centre of the target 5 and the image plane of the associated image-capturing device 6a and 6b, calculated along the optical axis $z_{tel}$.

In detail, for each target 5, a rotation matrix $MatRot_{trg}$ is defined that transforms the set of three vectors of known length, expressed in mm for example, in the target reference system $SdR_{trg}$ of the target 5 into another set of three vectors of inferable length, this also expressed in mm for example, in the image reference system $SdR_{tel}$ of the image-capturing device 6a and 6b; in other words, the rotation matrix $MatRot_{Trg}$ imposes a rotation through which a vector identified on the real target, and expressed in mm for example, is projected onto a plane parallel to the image plane, passing through the centre of the target and determines the dimensions thereof, in the same measurement unit.

Figure 5:
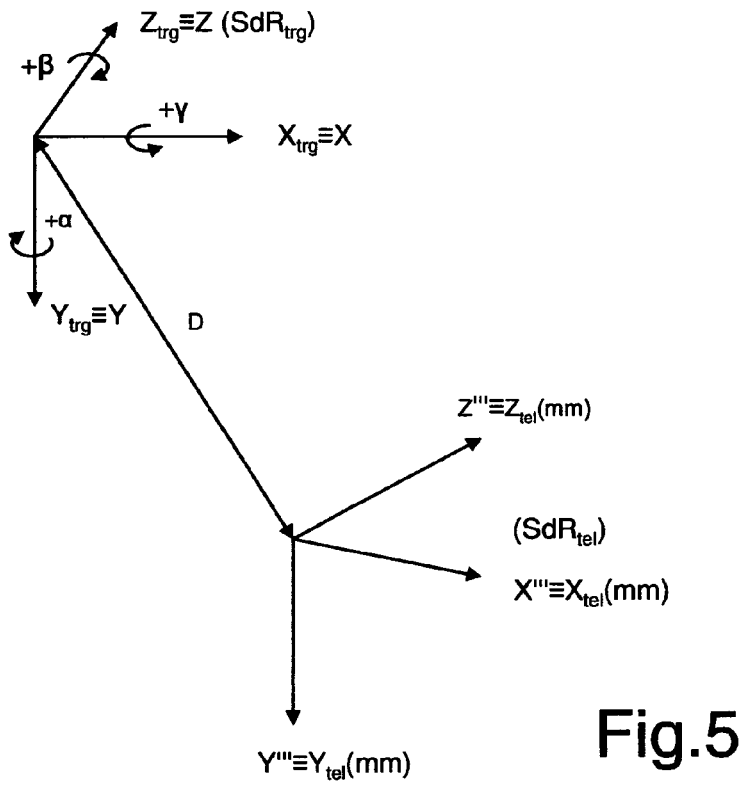
FIG. 5 shows a schematic diagram regarding the reciprocal arrangement of the reference systems associated with the target and an image-capturing device, which captures a two-dimensional image thereof.

By applying geometrical considerations, which shall be better understood by also referring to the diagram in FIG. 5, it is possible to demonstrate that the above-mentioned rotation matrix $MatRot_{Trg}$ can be expressed in the following manner:

| | | |
|---|---|---|
| $a_x = \cos(\alpha)*\cos(\beta)$ | $b_x = -\sin(\beta)*\cos(\gamma) + \sin(\alpha)*\cos(\beta)*\sin(\gamma)$ | $c_x = \sin(\beta)*\sin(\gamma)) + \sin(\alpha)*\cos(\beta)*\cos(\gamma)$ |
| $a_y = \cos(\alpha)*\sin(\beta)$ | $b_y = \cos(\beta)*\cos(\gamma) + \sin(\alpha)*\sin(\beta)*\sin(\gamma)$ | $c_y = -\cos(\beta)*\sin(\gamma) + \sin(\alpha)*\sin(\beta)*\cos(\gamma)$ |
| $a_z = -\sin(\alpha)$ | $b_z = \cos(\alpha)*\sin(\gamma)$ | $c_z = \cos(\alpha)*\cos(\gamma)$ | where $\alpha$, $\beta$ and $\gamma$, as shown in the above-mentioned FIG. 5, represent the unknown angles of rotation expressing the rotation of the three orthonormal axes associated with the target 5 with regard to the image reference system $SdR_{tel}$ of the image-capturing device 6a and 6b.

In greater detail, assuming that the set of three orthonormal axes X'"Y'"Z'" coincides with the image reference system $SdR_{tel}$, and that the set of three orthonormal axes XYZ coincides with the target reference system $SdR_{trg}$, the above-indicated rotation matrix $MatRot_{Trg}$ can be thought of as the combination of three successive rotations:

a first rotation of $\gamma°$, imposed between the first reference system (XYZ)≡$SdR_{trg}$ and a first intermediate reference system X'Y'Z', by making axis Y turn in the direction of axis Y' (going towards axis Z) around axis X via a first intermediate rotation matrix $\gamma$RotMat;

a second rotation of $\alpha°$ imposed between the first intermediate reference system (X'Y'Z') and a second intermediate reference system (X"Y"Z"), by making axis Z' turn in the direction of axis Z" (going towards axis X'), around axis Y' via a second intermediate rotation matrix $\alpha$RotMat; and a third rotation of $\beta°$, imposed between the second intermediate reference system (X"Y"Z") and the image reference system (X'"Y'"Z'")≡$SdR_{tel}$ by making axis X" turn in the direction of axis X'" (going towards axis Y") around axis Z" via a third intermediate rotation matrix $\beta$RotMat.

The above-mentioned first, second and third intermediate rotation matrices βRotMat, αRotMat and γRotMat are defined as follows:

| βRotMat | | |
|---|---|---|
| cos(β) | −sin(β) | 0 |
| sin(β) | cos(β) | 0 |
| 0 | 0 | 1 |
| αRotMat | | |
| cos(α) | 0 | sin(α) |
| 0 | 1 | 0 |
| −sin(α) | 0 | cos(α) |
| γRotMat | | |
| 1 | 0 | 0 |
| 0 | cos(γ) | −sin(γ) |
| 0 | sin(γ) | cos(γ) |

The overall rotation that describes the rotation between the target reference system $SdR_{trg}$ and the image reference system $SdR_{tel}$ is represented, as previously pointed out, by the rotation matrix $MatRot_{trg}$, which is obtained as the product of the above-mentioned intermediate rotation matrices βRotMat, αRotMat and γRotMat multiplied together and in the order indicated.

By using further geometrical considerations, it is also possible to obtain a relation between the dimensions in pixels of the projection vectors (Δxpix, Δypix)i and the corresponding dimensions in the length measurement unit (Δxmm, Δymm)i, based on the characteristics of the image-capturing devices 6a and 6b.

In particular: pixIMGdx and pixIMGdy are defined as the total dimensions in pixels of the two-dimensional image captured by the image-capturing devices 6a and 6b respectively along the transverse axes $X_{tel}$ and $Y_{tel}$ of the image plane; dfX and dfY are defined as the focal distances along the same transverse axes $X_{tel}$ and $Y_{tel}$, which establish a relation between the observation distance, expressed in mm, and the maximum observable dimension at that distance, again expressed in mm; lCCD and hCCD are defined as the dimensions in the length unit, expressed in mm in the example, of the sensor used by the image-capturing device 6a and 6b (a CCD—Charge Coupled Device in this embodiment) along the transverse axes $X_{tel}$ and $Y_{tel}$; L and H are defined as the maximum dimension visible from the image-capturing device 6a and 6b at distance D along the same transverse axes $X_{tel}$ and $Y_{tel}$.

It is then possible to demonstrate that the following relations are valid:

$$dfX = D \cdot lCCD/(L + lCCD)$$

$$dfY = D \cdot hCCD/(H + hCCD)$$

Furthermore, using the following relations:

$$L = pixIMGdx \cdot \Delta xmm/\Delta xpix$$

$$H = pixIMGdy \cdot \Delta ymm/\Delta ypix$$

gives:

$$dfX = D \cdot lCCD/(pixIMGdx \cdot \Delta xmm/\Delta xpix + lCCD)$$

$$dfY = D \cdot hCCD/(pixIMGdy \cdot \Delta ymm/\Delta ypix + hCCD)$$

The basic relations between the dimensions, in pixels and in the length measurement unit, of the projection vectors on the image plane are thus obtained:

$$\Delta xpix = \Delta xmm \cdot pixIMGdx \cdot dfX/(D \cdot lCCD - dfX * lCCD)$$

$$\Delta ypix = \Delta ymm \cdot pixIMGdy \cdot dfY/(D \cdot hCCD - dfY * hCCD)$$

Therefore, by using the rotation matrix MatRotTrg, it is possible to identify, for each rotation of the target 5, the relations that link together: the dimensions in the length unit, mm in the example, of any known vector in the real model ($\Delta x_{trg}$, $\Delta y_{trg}$, $\Delta z_{trg}$); the dimensions in pixels of the related projection vectors on the image plane (Δxpix, Δypix); and the unknown quantities (angles of rotation α, β and γ and distance D) that characterize this rotation:

$$\Delta xpix = (\Delta x_{trg} \cdot a_x + \Delta y_{trg} \cdot b_x + \Delta z_{trg} \cdot c_x) \cdot (pixIMGdx \cdot dfX/(D \cdot lCCD - dfX \cdot lCCD))$$

$$\Delta ypix = (\Delta x_{trg} \cdot a_y + \Delta y_{trg} \cdot b_y + \Delta z_{trg} \cdot c_y) \cdot (pixIMGdy \cdot dfY/(D \cdot hCCD - dfY \cdot hCCD))$$

where $a_x, b_x, c_x$ and $a_y, b_y, c_y$ are the elements of the rotation matrix MatRotTrg, as previously defined.

To find the values of the four unknown quantities (α, β, γ and D), it is therefore sufficient to observe the behaviour of at least two vectors considered significant in order to obtain four relations (in particular, the two above-mentioned relations for each of the two significant vectors), obtaining a resolvable system of four equations in four unknown variables; for example, the vectors $vx_{trg}$ and $vy_{trg}$ or, in alternative, any other pair of target vectors $vx_{trg}$, $vy_{trg}$ and $vz_{trg}$ of which the dimensions are known in the real world (expressed in mm for example), can be considered for this purpose.

The values of the four unknown variables completely define the rotation and translation function between the target reference system $SdR_{trg}$ and the image reference system $SdR_{tel}$; starting from these values, identified for each target 5 (and referring to the orientation of the associated wheel 2), it is possible to find (in a known manner) the values of the characteristic angles that define the set-up of the vehicle 3.

In particular, the processing device 8 is thus able to detect the orientation (in terms of angles of rotation α, β and γ) of each target 5, within the image reference system of the related image-capturing device 6a and 6b.

To detect the alignment of the wheels 2 of the vehicle 3 in a single reference system (for example the reference system identified on the same vehicle 3), in a step 23 successive to step 22 (referring again to FIG. 4), the processing device 8 determines the reciprocal orientation between the image-capturing devices 6a and 6b with respect to a single reference system, and consequently converts the angular and linear values determined in the previous step 22 into corresponding values valid in this single reference system.

In order to dynamically determine the relation of reciprocal positioning and orientation between the image reference systems associated with the image-capturing devices 6a and 6b, the system 1 comprises, as previously pointed out, the coupling structure 10, which is, for example, composed of two optical devices 10a and 10b that are similar and each associated with one of the image-capturing devices 6a and 6b. Both optical devices 10a and 10b consist of an optical transmission stage, for example, equipped with one or more LEDs, and an optical receiver stage, for example, equipped with one or more linear CCDs, receiving the light radiation emitted by the optical transmission stage associated with the other device. Based on the position of the light sources in the image captured by each optical device, the processing device 8 continuously determines, in a manner which is known and is consequently not described in detail, the reciprocal position and orientation between the image-capturing devices 6a and 6b (in terms of reciprocal rotation and translation).

As an alternative, the system 1 may comprise a further image-capturing device, again indicated by reference numeral 10a, arranged in an integral manner with the first image-capturing device 6a, and a further target, again indicated by reference numeral 10b, arranged in an integral manner with the second image-capturing device 6b. The further image-capturing device 10a and target 10b can be made to operate, for example, in a manner similar to that previously described in relation to determining the orientation angles of the targets 5 connected to the wheels 2 of the vehicle 3.

Alternatively, to resolve the problem of determining the reciprocal position of the image-capturing devices 6a and 6b in a static manner, the processing device 8 could establish a relation between the related image reference systems during a specific adjustment step, where a gauge (or reference element) is simultaneously identified by both image-capturing devices 6a and 6b.

In any case, at the end of the above-mentioned step 23, the processing device 8 determines, in step 24, the results in terms of the characteristic set-up angles of the wheels 2 of the vehicle 3, for example convergence and camber angles, expressed in a single reference system, for example the reference system associated with the vehicle 3; the processing device 8 also controls the display of these results on a suitable display device, for example for presenting them to an operator.

In a manner not shown, the system 1 can be completed by including an associated illuminator device for each image-capturing device 6a and 6b that guarantees sufficient illumination on both sides of the vehicle 3, with respect to the longitudinal axis A, for the processing of acquired images; this illumination is opportunely reflected by the target elements 12, enabling their identification. In particular, the wavelength of the radiation used for this illumination operation can be defined according to the target chosen, as can its flashing frequency; for example, a visible or infrared light source could be used.

Figure 6:
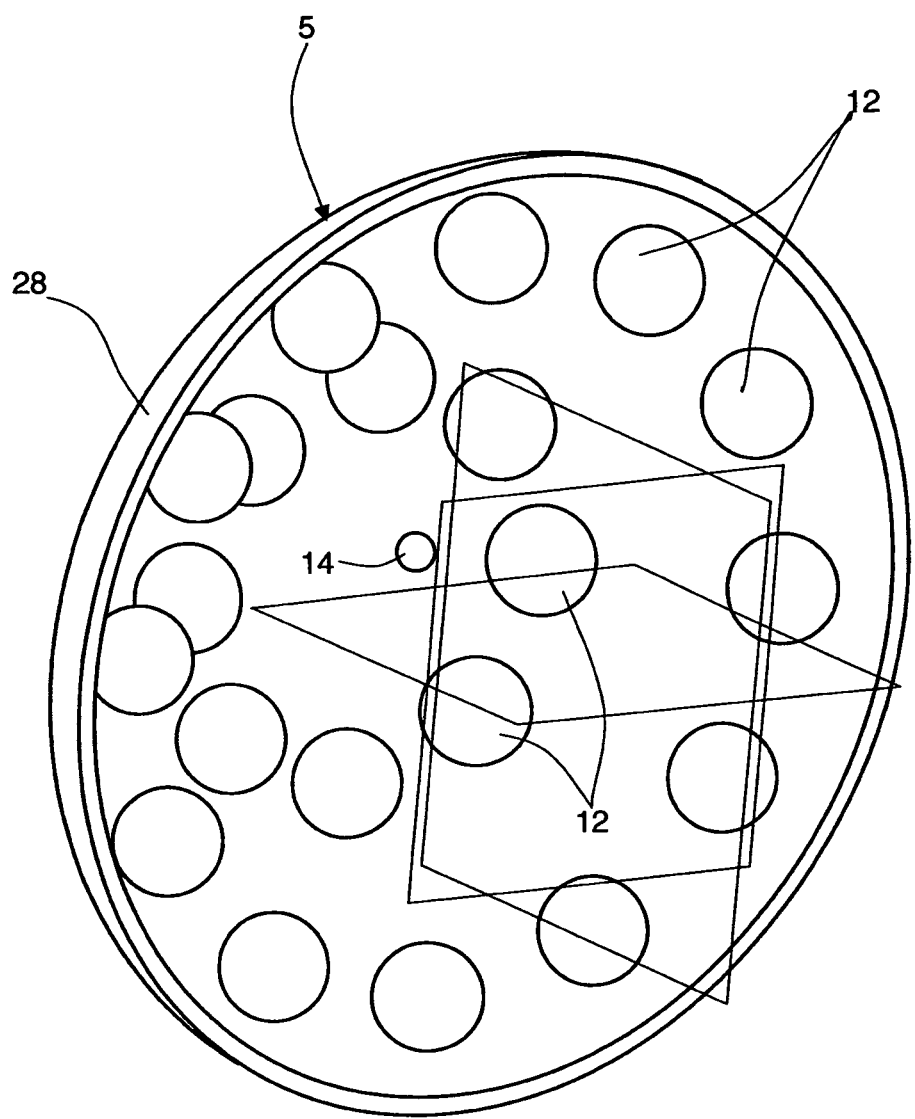
FIGS. 6 and 7a-7b are perspective views of further embodiments of a target used in the system in FIG. 1.

In one embodiment, as shown in FIG. 6, the target 5 comprises a support structure 28 that internally defines a concave spherical surface (or portion of a spherical surface) upon which the target elements 12 are designed to be arranged. For example, the support structure 28 could consist of a concave spherical cap. Advantageously, this shape allows easy definition of the set of three orthogonal axes associated with the target 5 (which corresponds to a set of three segments, or vectors, also identifiable on the image plane, where they are measured in pixels), with various reciprocal three-dimensional arrangements of the target elements 12.

In the embodiment in FIG. 6, which for illustrative purposes only refers again to the case where the target elements 12 are arranged on two mutually parallel planes, the target elements 12 defining the outer circular ring are coupled to the edge portion of the support structure 28, by gluing for example, while the target elements 12 defining the inner circular ring are coupled to the inner portion of the same support structure 28. In this case, the outer and inner circular rings are arranged on two sections of a spherical segment subtended by the spherical cap, parallel to each other and orthogonal to the axis of the target. In this case, the reference element 14 is coupled to the same support structure 28, inside the inner circular ring of target elements 12.

The use of a target 5 with a configuration comprising a concave spherical cap-shaped support structure 28 containing the target elements 12 therein allows identification of the set of three orthogonal vectors associated with the target over a wide angular range of observation (for example, between −30° and +30°).

Figure 7A:
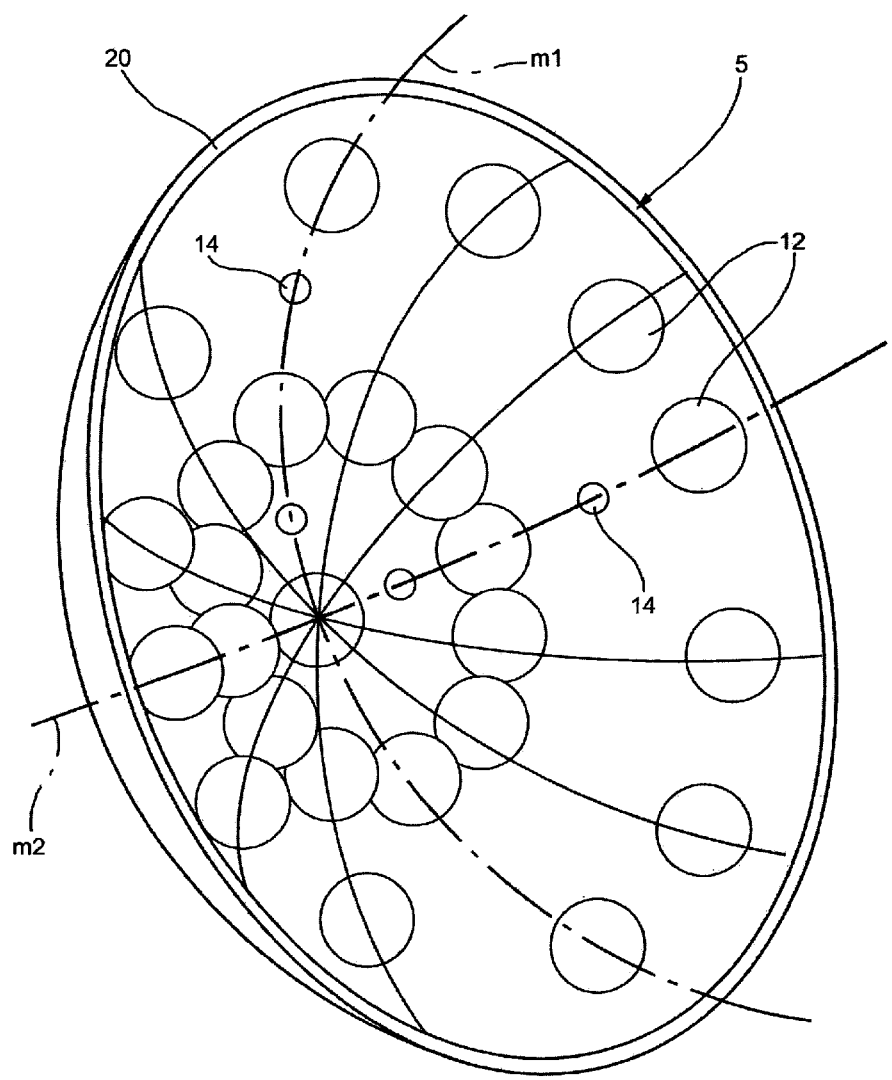
Figure 7B:
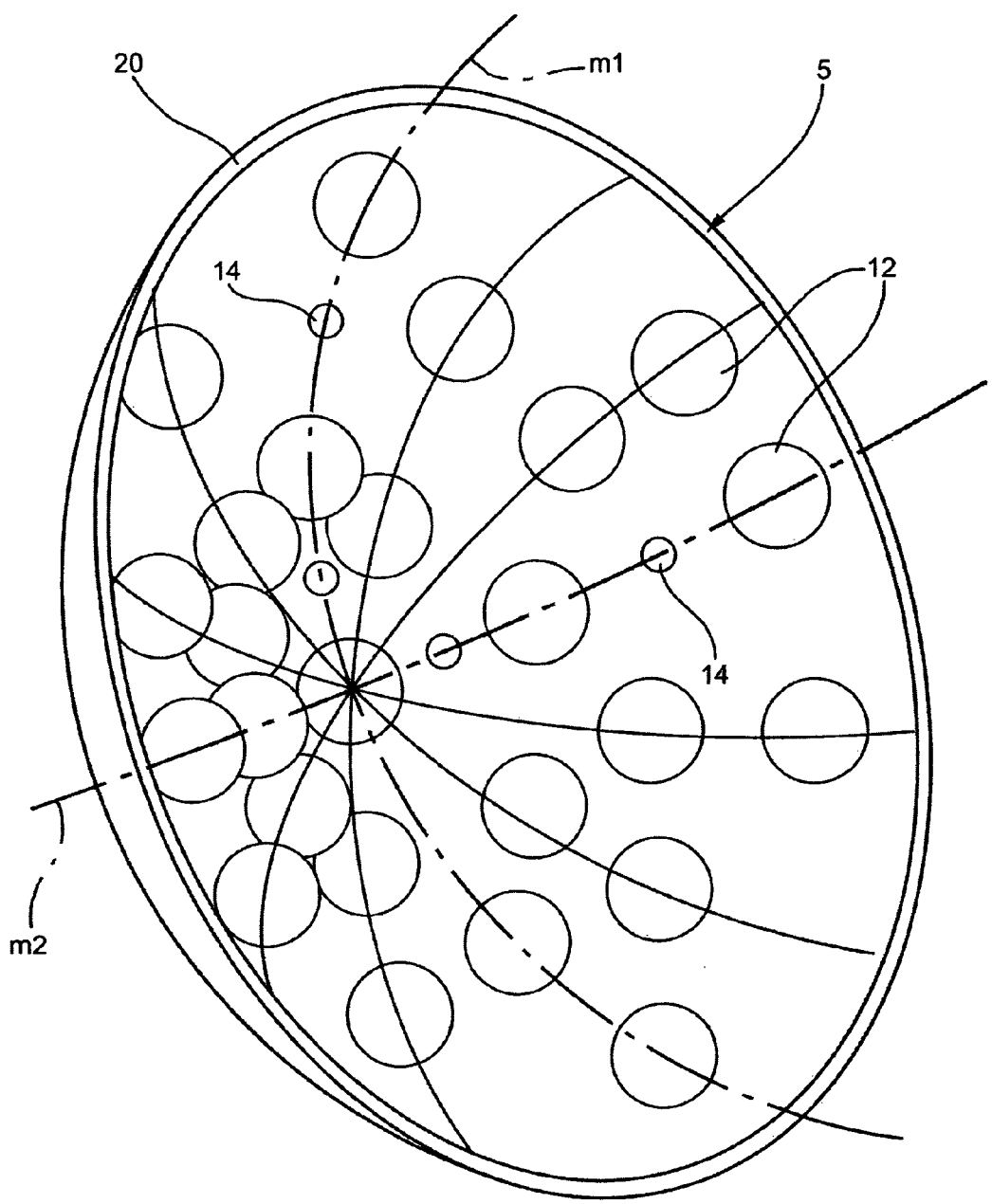

In addition, as shown in FIGS. 7a-7b, the particular spherical shape of the support structure 28 also enables the possibility of different processing of the two-dimensional images of the target 5, also valid in the case where the target elements 12 are not arranged on two parallel planes. The target elements 12 may in fact lie on meridians defined inside the support structure 28 and angularly equispaced from one another, being arranged on multiple sheaves of planes or, alternatively on generic planes (not mutually parallel) that intersect the spherical surface and, as a special case, again on two mutually parallel planes (as in the previously discussed example).

In any case, the presence of a further target element 12 arranged centrally with respect to the support structure 28 that identifies the geometric centre and the point of intersection of the various meridians is advantageous.

In particular, as schematically shown, the three-dimensional arrangement of the target elements 12 enables the identification of at least a first and a second meridian m1 and m2 (constituted by semi-elliptic curves intersecting at the centre of the support structure 28) substantially orthogonal to each other, along which the sphere centres of some of the target elements 12 are aligned (in this case, the target elements 12 identified in a suitable manner by an associated pair of reference elements 14). In addition, the meridians identified in the image can advantageously be more than two, for example, being six in number, angularly equispaced from one another at an angle of 30°; in this case, identification of the six meridians allows the identification of six corresponding angularly equispaced directions, thereby achieving an increase in measurement stability.

For example, as shown in FIG. 7b, although being arranged along the six meridians, the target elements 12 are not arranged on just two parallel planes, but generally on a sheaf of planes that intersect the concave spherical surface inside the support structure 28 (not being arranged on just two concentric rings in this case). The arrangement of the target elements 12 enables identification of the desired three-dimensional geometrical characteristics inside the target 5 also in this case.

The processing operations on the two-dimensional images to identify the rotation of the target 5, and of the associated wheel 2, may envisage determining the inclination of the meridians (for example, measured in correspondence to the position of the central target element 12) to determine the direction of the vectors associated with the target 5, the rotation of which with respect to the reference system can be obtained with known techniques; the deformation of the meridians (and corresponding directions) as the angle of rotation of the wheel changes, and therefore that of the associated target 5 with respect to the reference system of the image-capturing device 6a and 6b, can also be analyzed.

The advantages of the system and the method for determining vehicle wheel alignment according to the invention are clear from the previous description.

In particular, it should be again underlined that the use of three-dimensional targets (in particular, formed by a three-dimensional arrangement of target elements) and, in particular, the use of target elements that are also three-dimensional, enables determining the absolute position and orientation of each target (and of the wheel to which the same target is coupled) with respect to a fixed reference system, in a precise and secure manner using a single image-capturing device, without it being required to move the vehicle or the wheels of the vehicle to vary the spatial position of the targets, move the targets, or resort to the utilization of a stereo acquisition system. In fact, it is easy to determine a set of three orthogonal axes associated with the target (identifying reference target elements) in space, and in this way to determine the spatial orientation of the same target inside a given reference system.

The described solution also allows increasing measurement resolution with respect to standard solutions, without, for example, requiring an increase in the size of the targets used.

In other words, three-dimensional information is advantageously and intrinsically associated with the target, through which it is possible to determine the spatial orientation starting from the processing of even just one two-dimensional image (transforming the two-dimensional information provided by the image-capturing device into three-dimensional information, thanks to the target's particular geometric structure).

Furthermore, thanks to the fact that the reciprocal arrangement of the target elements 12 is defined by a known three-dimensional geometric shape (expressed by means of an analytical expression), it is possible to identify the set of three orthogonal vectors even in the case where one or more of these same target elements are not visible, for example, due to the superimposition of multiple target elements on the image plane. This advantage derives in fact from the combined processing of the target elements 12, which are considered as belonging to the same known three-dimensional geometric figure.

In particular, thanks to the use of spherically shaped three-dimensional target elements with isotropic characteristics, measurement accuracy remains unchanged as the inclination of the targets varies with respect to the image reference systems of the image-capturing devices 6a and 6b.

Finally, it is understood that changes and modifications may be made to what described and illustrated herein without departing from the scope of the present invention, as defined in the attached claims.

In general, the target 5 may have a different three-dimensional shape. In any case, the target is shaped so as to allow the definition of vector quantities according to a known three-dimensional arrangement, in particular so as to allow the identification of a set of three orthogonal axes associated with it (for example, by the identification of significant points or planes on the same target), preferably under different visual angles (for example in an angle range between −30° and +30°). For example, the orthogonal vector $vz_{trg}$ may be determined through the identification of a significant point and plane of the target 5, such as the vector originating from this point and orthogonal to this plane. In particular, the configuration described for the targets 5 allows measurement resolution to be kept constant and maximised throughout the whole angle range considered.

One or more of the targets 5 may also be replaced by targets of the active type, i.e. constituted by target elements that, instead of reflecting incident radiation, are capable of generating and emitting electromagnetic radiation, in the visible frequency range or, in alternative, in the infrared range.

Figure 8:
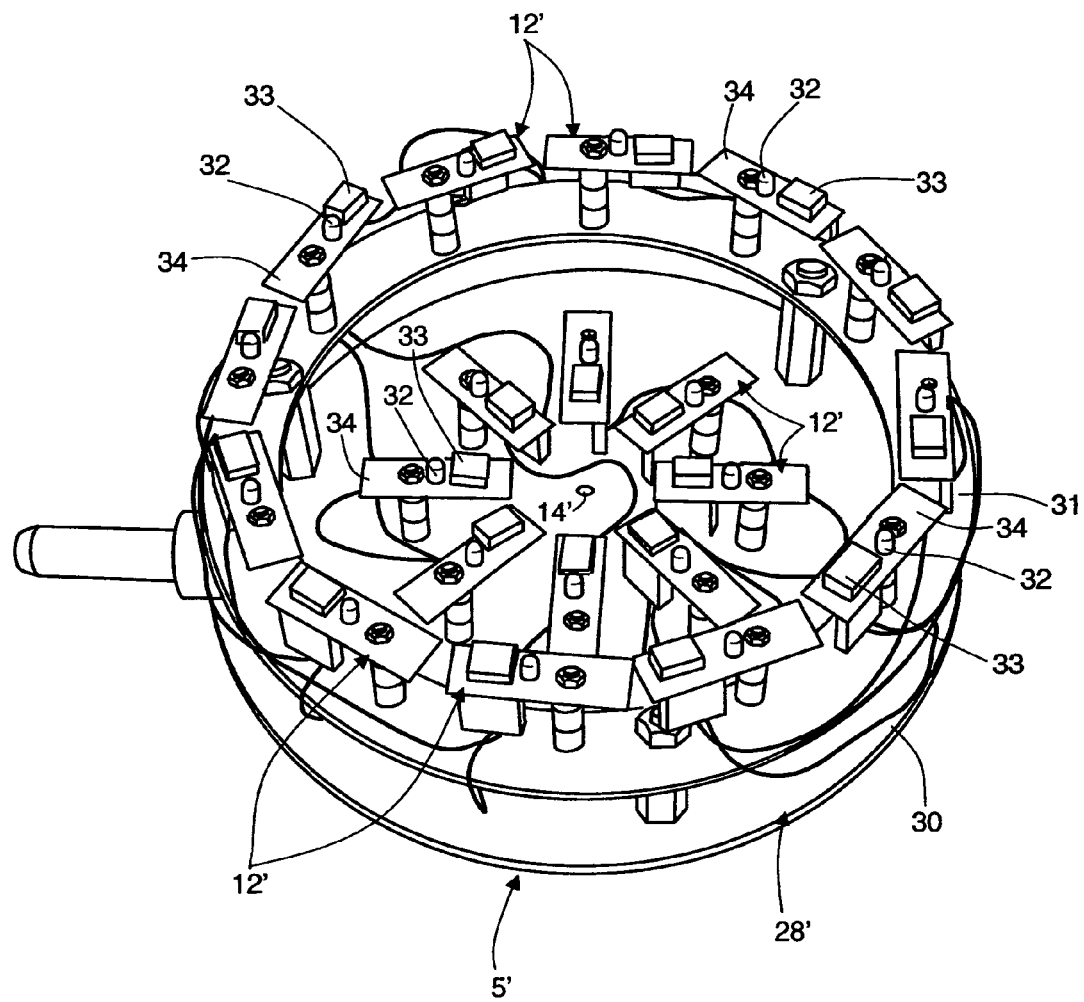
FIG. 8 shows a perspective view of yet a further embodiment of a target of the active type that can be used in the system in FIG. 1.

In particular, as shown in FIG. 8, the target, indicated here with reference numeral 5', comprises a support structure, indicated with reference numeral 28', composed of a base disc 30 and a circular rim 31 connected above the base disc 30 and having an outer diameter coinciding with the diameter of the same base disc 30; for example, the circular rim 31 is connected to the base disc 30 via suitable coupling elements, including screws and column spacers for example.

The target elements, indicated here with reference numeral 12', of the outer ring are mechanically coupled to the circular rim 31, while the target elements 12' of the inner ring are mechanically coupled to the base disc 30. Each target element 12' comprises an emitter unit 32, constituted by a pair of LEDs for example, and associated control electronics 33 connected to a printed circuit board 34.

As is clear from examining FIG. 8, the target 5' has a three-dimensional configuration in this case as well (given by the superimposing of the circular rim 31 on the base disc 30 and by the reciprocal arrangement of the various target elements 12'), with the associated target elements 12' arranged, in the example, along the respective outer and inner circular rings, on parallel and superimposed planes. Again, a reference element can also be present, indicated here with reference numeral 14' and constituted by a single LED (or by a similar emission element emitting visible or infrared radiation) carried on the base disc 30, within the inner ring of target elements 12' in a position corresponding to a given target element, considered significant. Thus, by using substantially the same criteria previously discussed in detail, it is possible to identify vector quantities in an unambiguous manner in this active target structure as well. In general, it should be noted that the LEDs also satisfy the isotropic principle that is satisfied by the target elements 12 of the passive target, as they maintain their shape when observed from different angles, at the most reducing light intensity as the angle of inclination increases.

The advantage of an active solution with respect to the use of passive target elements 12 consists in the fact of not needing an illuminator device, which, in addition to potentially being bothersome for the operator, even in the event where infrared radiation is emitted, having to illuminate the target from a certain distance in any case entails higher electric power consumption.

The described system could also include a larger number of image-capturing devices, in particular more than two, arranged in equal numbers on both the right-hand and left-hand sides with respect to the longitudinal axis A of the vehicle 3. In addition, it could also be possible to use a single image-capturing device, capable of framing all the targets associated with the wheels 2 of the vehicle 3 for which it is wished to determine the orientation.

Figure 9:
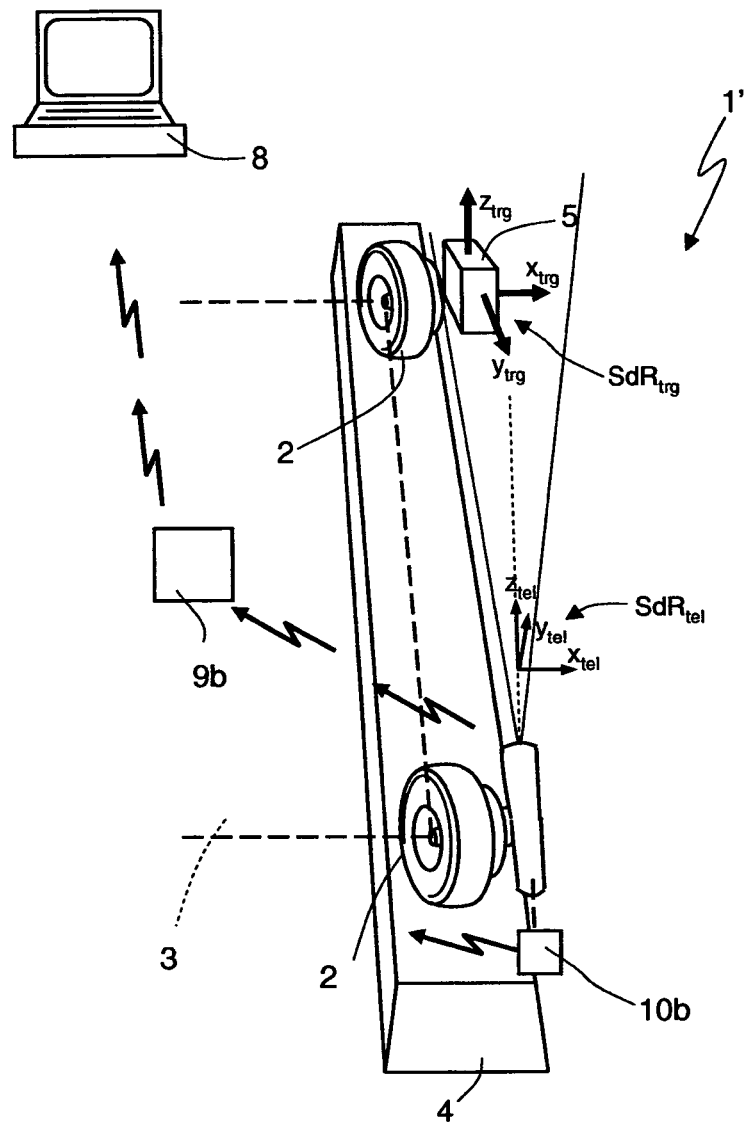
FIG. 9 shows a schematic representation of a vehicle wheel alignment system, according to a different embodiment of the present invention.

Furthermore, as shown schematically in FIG. 9 (which, for simplicity of illustration, refers to just one side of the vehicle 3), the alignment determining system, indicated here with reference numeral 1', could have a different configuration with regard to the arrangement of the image-capturing devices 6a and 6b. In this case, just one pair of targets 5 is contemplated, connected for example to just the front wheels of the vehicle 3; in this case, the image-capturing devices 6a and 6b (as shown in FIG. 9 for just the right-hand side of the vehicle 3), instead of being connected to the support structure 7 external to the vehicle 3 (constituting the so-called active "measuring heads"), are actually connected directly to the wheels, the rear ones of the same vehicle in the example, by special mounting devices. In this case, as there is no device external to the vehicle that establishes a relation between the reference systems where the images are acquired, special optical devices 10a and 10b (for example, of type described with reference to FIG. 1) that establish a relation between the measurements regarding the two sides of the vehicle are mounted on the measuring heads and connected to the wheels 2 of the vehicle 3; the optical devices 10a and 10b, by reciprocally measuring each other, provide the reciprocal orientation between the measuring heads.

It should be pointed out that the remaining system and method used for determining the orientation of the three-dimensional targets in space does not substantially differ from that previously illustrated, again providing the reconstruction of the three-dimensional characteristics of the target 5 starting from the two-dimensional images acquired by the image-capturing devices 6a and 6b.

In a substantially similar manner, not shown, the alignment determining system can also envisage the image-capturing devices 6a and 6b being mounted directly on the car lift 4, again without substantial differences regarding the method of measuring and using the information obtained from observation of the three-dimensional targets associated with the wheels 2 of the vehicle 3.

In general, it will be evident that the difference from the metrological standpoint linked to the different arrangement of the image-capturing devices 6a and 6b consists in the identification of the reference system with respect to which the measurements are returned; in particular, in the embodiment shown in FIG. 9, this reference system is positioned on the vehicle 3.

Finally, the described system and the method obviously also allow determining the spatial orientation of just a single wheel 2 of the vehicle 3, the image of which is taken by a single image-capturing device 6a or 6b.

The invention claimed is:

1. A system for determining an orientation of at least one first wheel of a vehicle, comprising:
    at least one first target configured to be integrally coupled to said first wheel;
    image capturing means configured so as to acquire a first two-dimensional image of said first target; and
    a processing device, operatively coupled to said image capturing means and configured to process said first two-dimensional image,
    wherein said first target comprises a plurality of target elements having a three-dimensional shape, reciprocally arranged according to a pre-determined three-dimensional geometric configuration, wherein said three-dimensional geometric configuration is designed to define a set of three orthogonal target vectors ($vx_{trg}$, $vy_{trg}$, $vz_{trg}$) defining a target reference system ($SdR_{trg}$), the spatial orientation of which corresponds to the orientation of said wheel;
    said processing device being configured to process said first two-dimensional image according to said three-dimensional geometric configuration, to identify therein positions of said target elements and projection vectors ($vx_{trg\_prj}$, $vy_{trg\_prj}$, $vz_{trg\_prj}$) of said target vectors ($vx_{trg}$, $vy_{trg}$, $vz_{trg}$), and to determine a spatial arrangement of said target vectors ($vx_{trg}$, $vy_{trg}$, $vz_{trg}$) with respect to a reference system based on geometrical characteristics of said projection vectors, thereby determining orientation characteristics of said first wheel;
    wherein said processing device is configured to determine linear measurements of said projection vectors ($vx_{trg\_prj}$, $vy_{trg\_prj}$, $vz_{trg\_prj}$) in said first two-dimensional image, and to determine spatial rotation angles of said set of three orthogonal target vectors ($vx_{trg}$, $vy_{trg}$, $vz_{trg}$) with respect to said reference system as a function of said linear measurements and of corresponding actual known measurements of said target vectors ($vx_{trg}$, $vy_{trg}$, $vy_{trg}$).

2. The system according to claim 1, wherein said target elements have a three-dimensional shape with isotropic characteristics with respect to variations of an observation angle of said first target by said image capturing means.

3. The system according to claim 1, wherein said target elements have a spherical shape; and said processing device is configured to determine positions of the sphere centres of said target elements within said first two-dimensional image and to determine at least one of said projection vectors ($vx_{trg}$, $vy_{trg}$, $vz_{trg}$) of said target vectors ($vx_{trg}$, $vy_{trg}$, $vz_{trg}$) as the vector joining the sphere centres of a significant pair of said target elements.

4. The system according to claim 3, wherein said first target further comprises at least one reference element having a predetermined arrangement with respect to said significant pair of said target elements; and wherein said processing device is configured to identify said significant pair of said target elements based on the identification of a position of said reference element.

5. The system according to claim 3, wherein said target elements are arranged to form a first and a second ring, arranged on distinct planes and defining a first and a second centre ($O_1$, $O_2$); and wherein said processing device is configured to define an orthogonal projection vector ($vz_{trg\_prj}$) among said projection vectors ($vx_{trg\_prj}$, $vy_{trg\_prj}$, $vz_{trg\_prj}$) as the vector joining said first and second centres ($O_1$, $O_2$).

6. The system according to claim 5, wherein said first and second rings are substantially circular; and wherein said processing device is configured to define a first and a second transversal projection vector ($vx_{trg\_prj}$, $vy_{trg\_prj}$) among said projection vectors ($vx_{trg\_prj}$, $vy_{trg\_prj}$, $vz_{trg\_prj}$) as the vectors joining the geometrical centres of a respective pair of target elements forming one ring of said first and second rings.

7. The system according to claim 1, wherein said first target further comprises a support structure internally defining a concave spherical surface; and wherein said target elements are mechanically coupled to said support structure and arranged on said spherical surface, so as to form said three-dimensional configuration.

8. The system according to claim 7, wherein at least some of said target elements are arranged along at least a first and respectively a second meridian (m1, m2) defined by said spherical surface of said support structure.

9. The system according to claim 7 wherein said support structure substantially has a concave spherical cap shape, and said target elements are arranged along six meridians defined by said spherical surface, angularly equispaced from one another.

10. The system according to claim 7, wherein said target elements are arranged on at least two mutually parallel sections of a spherical segment subtended by said support structure.

11. The system according to claim 1, wherein said target elements are of the active type and emit visible or infrared radiation.

12. The system according to claim 1, further comprising:
    at least one second target integrally coupled to a second wheel of said vehicle; and
    wherein said image capturing means are configured to acquire a second two-dimensional image of said second target, and said processing device is configured to process said second two-dimensional image to determine orientation characteristics of said second wheel, and to jointly process said orientation characteristics of said first and second wheels in order to determine the alignment characteristics of said vehicle.

13. The system according to claim 1, wherein said second wheel is arranged in a position diametrically opposite to said first wheel with respect to a longitudinal axis of said vehicle; and wherein said image capturing means comprise a first image-capturing device configured to acquire said first two-dimensional image of said first target, and a second image-capturing device configured to acquire said second two-dimensional image of said second target; said system further comprising determination means for determining the reciprocal orientation of said first and second image-capturing device, operatively coupled to said processing device for determining the alignment characteristics of said vehicle.

14. A method for determining an orientation of at least one first wheel of a vehicle, comprising:
- capturing a first two-dimensional image of at least one first target integrally coupled to said first wheel; and
- processing said first two-dimensional image,
- wherein said first target comprises a plurality of target elements having a three-dimensional shape, reciprocally arranged according to a pre-determined three-dimensional geometric configuration, said three-dimensional geometric configuration being designed to define a set of three orthogonal target vectors ($vx_{trg}$, $vy_{trg}$, $vz_{trg}$) defining a target reference system ($SdR_{trg}$), the spatial orientation of which corresponds to the orientation of said wheel; and
- in that said processing step comprises:
  - processing said first two-dimensional image according to said three-dimensional geometric configuration,
  - identifying positions of target elements and projections of said target vectors ($vx_{trg}$, $vy_{trg}$, $vz_{trg}$) in said first two-dimensional image; and
  - determining a spatial arrangement of said target vectors ($vx_{trg}$, $vy_{trg}$, $vz_{trg}$) with respect to a reference system based on the geometrical characteristics of said projection vectors, thereby determining the orientation characteristics of said first wheel;
- wherein said step of determining a spatial arrangement comprises determining linear measurements of said projection vectors ($vx_{trg\_prj}$, $vy_{trg\_prj}$, $vz_{trg\_prj}$) in said first two-dimensional image and determining spatial rotation angles of said set of three orthogonal target vectors ($vx_{trg}$, $vy_{trg}$, $vz_{trg}$) with respect to said reference system based on said linear measurement and corresponding actual known measurements of said target vectors ($vx_{trg}$, $vy_{trg}$, $vz_{trg}$).

15. The method according to claim 14, further comprising the steps of:
- capturing a second two-dimensional image of at least one second target integrally coupled to a second wheel of said vehicle;
- processing said second two-dimensional image to detect orientation characteristics of said second wheel; and
- jointly processing said orientation characteristics of said first and second wheels to determine alignment characteristics of said vehicle.

16. A computer program product comprising code portions stored on a computer readable medium, configured to implement, when executed by said computer, the steps of the method according to claim 14.

* * * * *